Sept. 23, 1969             L. BOVONE             3,468,782
MACHINE FOR HAVING GLASS PLATES ELECTROCHEMICALLY COPPER PLATED
BY MEANS OF SOLUBLE ELECTRODES, IN THE MAKING OF MIRRORS
Filed Oct. 12, 1965                                     3 Sheets-Sheet 1

INVENTOR.
LUIGI BOVONE
BY Steinberg & Blake
attys

Sept. 23, 1969 L. BOVONE 3,468,782
MACHINE FOR HAVING GLASS PLATES ELECTROCHEMICALLY COPPER PLATED
BY MEANS OF SOLUBLE ELECTRODES, IN THE MAKING OF MIRRORS
Filed Oct. 12, 1965 3 Sheets-Sheet 2

INVENTOR.
LUIGI BOVONE
BY Steinberg & Blake
attys

INVENTOR.
LUIGI BOVONE
BY Steinberg + Blake
attys

United States Patent Office 3,468,782
Patented Sept. 23, 1969

3,468,782
MACHINE FOR HAVING GLASS PLATES ELECTROCHEMICALLY COPPER PLATED BY MEANS OF SOLUBLE ELECTRODES, IN THE MAKING OF MIRRORS
Luigi Bovone, Circonvallazione Stura, Ovada, Alessandria, Italy
Filed Oct. 12, 1965, Ser. No. 495,266
Claims priority, application Italy, Feb. 5, 1965, 978/65
Int. Cl. B65g 49/06; C23b 5/68, 5/50
U.S. Cl. 204—198                    7 Claims

ABSTRACT OF THE DISCLOSURE

A machine for electrochemically depositing on one side on a glass plate, which has been previously coated with silver, a thin film of a metal such as copper. The machine is adapted to be used to the manufacture of mirrors. The electrolyte bath. The second conveyer means supports an electrode means forming an anode as well as a contact means which coacts with the silver-plated side of the glass plate to establish an electrical connection therewith, and by providing a suitable source of current to coact on the one hand with the electrode means carried by the second conveyer means and on the other hand with the contact means carried by the second conveyer means, an electric circuit is established resulting in conversion of the silver-plated side of the glass plate into a cathode so that a protective layer of a metal such as copper can be electrochemically deposited on the silver plating.

---

This invention relates to a machine by which a very thin film of copper, or other suitable metal, is electrochemically deposited on one side of a glass plate, onto the silver layer previously applied into direct contact with the glass. Such a machine is utilized in the production of mirrors, in order to have a protective layer of copper applied over the silver layer, previously applied by any other method. According to the invention, the glass plates, after having been silver plated by any other, already known method, are laid on a conveyor with the silver plated side upwardly directed, and brought into an electrolyte bath. Then a row of soluble copper anodes and of contact members to which a negative potential is applied, depending from a further conveyor, that is kept running above glass plates when they are immersed in the electrolyte, are brought into contact with the silver layer of glass plates, which consequently become the other electrode, i.e. the cathode. To establish the required electrical connections, the soluble anodes are kept in sliding contact with bus bars (which are connected with a source of positive potential), and a similar solution is adopted for the contact members that come into contact with the silver plating of a glass plate, to convert the same into a cathode.

The invention will be better appreciated from a consideration of the following, detailed description, taken with the accompanying drawings, wherein a particular, now preferred embodiment form thereof is diagrammatically shown, both description and drawings giving a non restrictive example only. In the drawings:

FIG. 1 is a perspective view of a part of the machine according to the invention.

FIG. 2 diagrammatically shows the arrangement of conveyor means.

Figure 1:
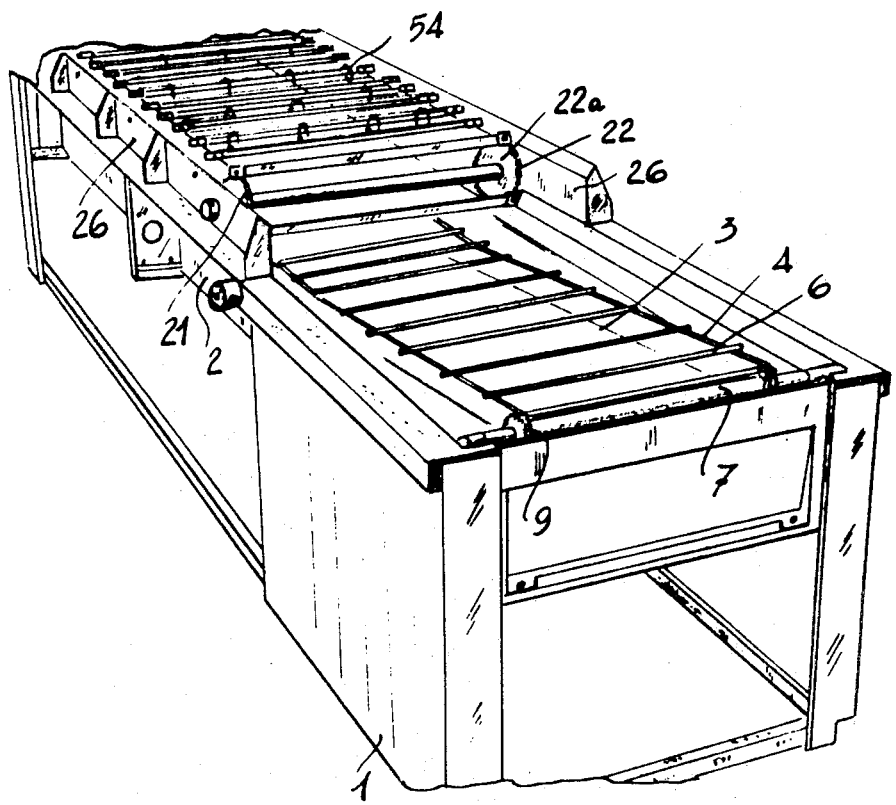

Referring now to above figures, 1 is the machine frame, made of structural shapes and steel sheets, suitably connected with one another by already known means. A tank 2, containing the electrolyte bath 3, is fitted on top of supporting frame 1. Two conveyor bands 4 are fitted, slightly inclined in respect of the horizontal, on either end of tank 2, such conveyors being respectively designed to feed the glass plates to a central conveyor 5, and to bring the plates away therefrom.

Figure 2:
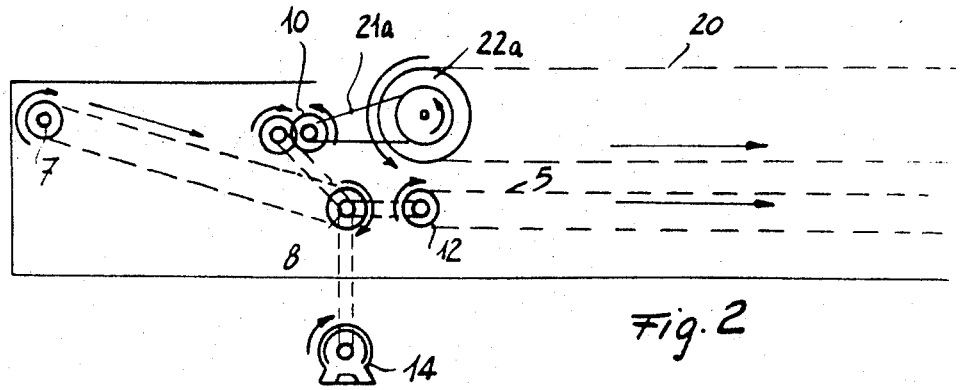

The central, horizontal conveyor 5 consists—like the end conveyors 4—of a series of plastics coated metal tubes 6, parallel with one another, and secured to chains, that run on sprocket wheels 9' keyed on revolving shafts 7, 8 and 12. In this manner, a conveying plant is obtained which consists of three conveyors, i.e. two inclined end conveyors 4, and one horizontal central conveyor 5. Such conveyors are driven from the outside of bath (and to such a purpose, some of sprocket wheel shafts extend, through sealed bearings, to the outside of tank walls 2) by chain transmissions, as diagrammatically shown in the FIG. 2, and by which the electric motor 14 is connected with the shaft 8, which is in turn connected with the shaft 12. A similar chain transmission is provided on the opposite end of central conveyor 5, in order to drive the discharging end conveyor. An electrode holder conveyor, indicated in its entirety by the numeral 20, is above central conveyor 5 and is driven by the chain transmission 21a, from the pair of gears 10, allowing a reversal of the direction. Conveyor 20 consists of two chains 21 and 22, parallel with each other, and by which the conveyor sides are respectively defined. These chains run on sprocket wheels 22a and are of the conventional type, and are provided with rollers 23, fitted between their links, and by which the upper length of chain is guided on the top of a reversed T-section 25, that is supported in any suitable, known manner, between the sides 26 of frame 1, which extends, as a continuation of sides of tank 2, over the whole length of track conveyor 20.

Figure 5:
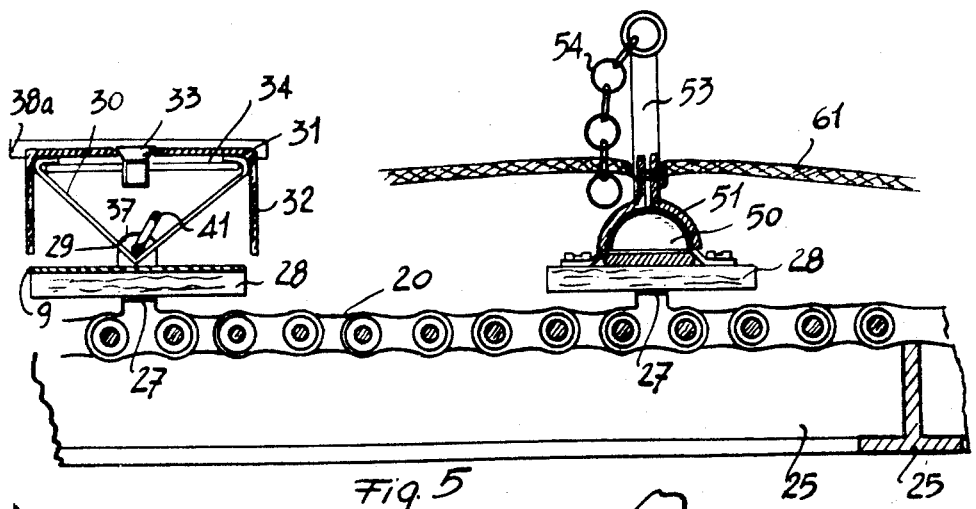
FIG. 5 is a partly sectioned side elevation of one of the chains wherefrom the two different electrode types depend—i.e. the soluble anode and the cathode, that consists in a metal bar, designed to support members which are designed to come into contact with the glass plate silver plating, in order that the copper can be deposited thereon.
Figure 4:
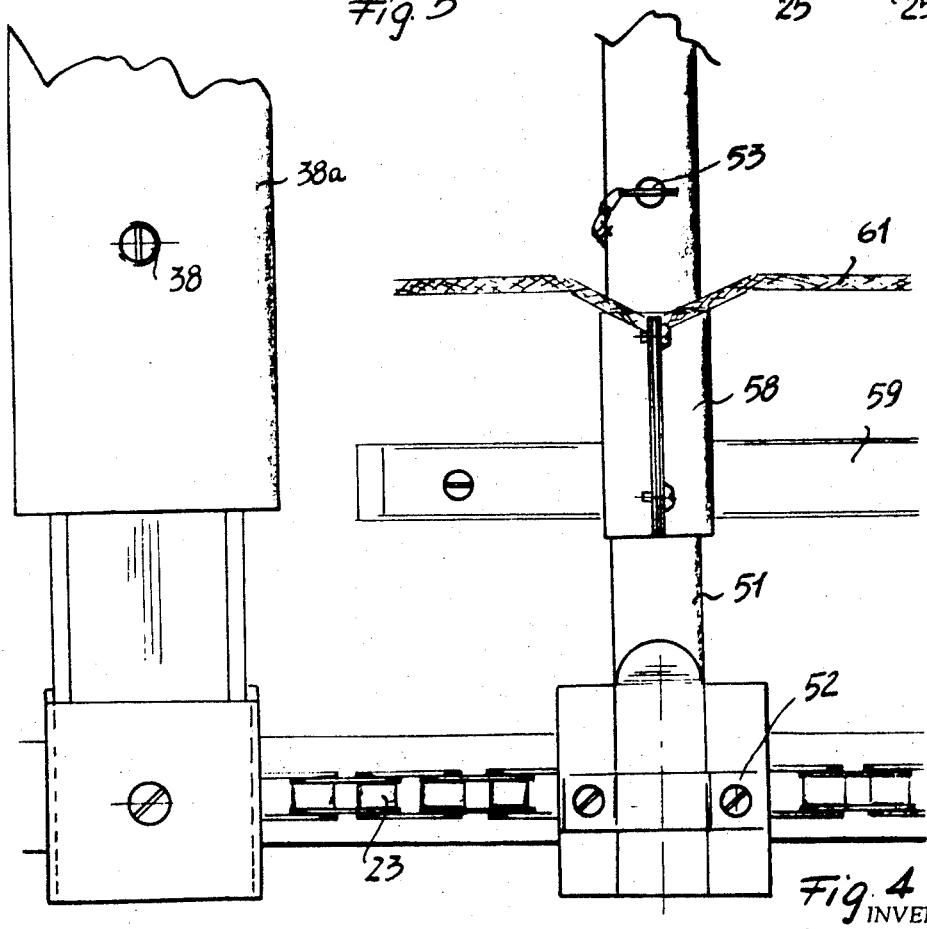
FIG. 4 is a plan view of a detail of an electrode conveyer chain.

The electrodes—i.e. the soluble anodes and the cathodes—are supported by the two chains 21 and 22, midway therebetween. In more detail, and as shown by the FIGS. 4 and 5, suitably spaced supporting wings 27 are secured to chain links. Fast with such wings are plates 28, made of an insulating material, to which metal plates 9 are secured (being thereby electrically insulated from the chains). Vertically directed, apertured wings 37, fastened to the center of metal plates 9 are engaged into a slot 29 of a substantially V-shaped, stainless steel section 30. A short, C-shaped plate 32 rests against both inwardly bent upper edges of said section 30 (see FIG. 5). Plate 32 is rigidly connected, by the screw 33, with a counterplate 34, that rests on the inner sides of bent edges 31.

Figure 3:
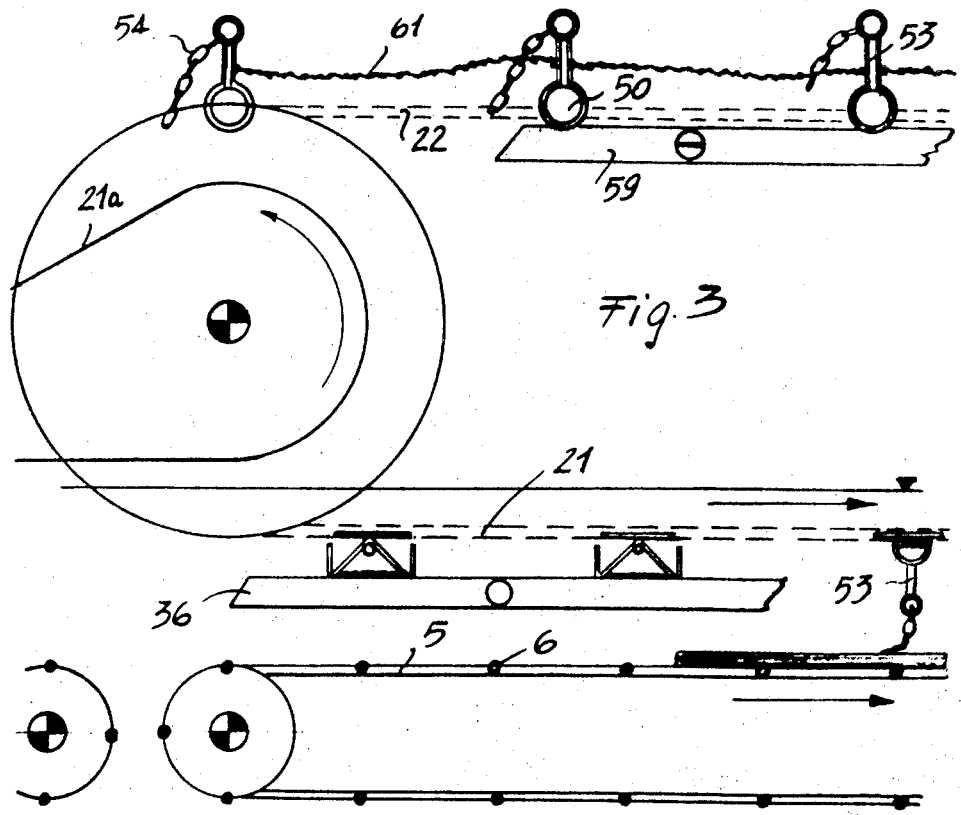
FIG. 3 is a partly sectioned, diagrammatic side elevation of the bus bar system through which current is fed to the electrodes.

Said plate 32 is made of an electrically conductive metal (stainless steel), and by sliding on bus bars 36 (see FIG. 3), that extend from one side of tank 2, allows the electric current to be fed to the soluble electrodes 38a which, being secured to C-shaped plate 32, are in electrical contact therewith.

The anodes 38a consists of substantially straight copper rods, that are secured by screws 38 to the counterplates 34, and rest against the inwardly bent edges 31 of V-shaped section 30. More precisely, the anodes are swingingly suspended by means of stainless steel ring 41, extending through a hole with which each support 9 is formed, whereby in the lower length of conveyor, they take a position substantially parallel to upper, silver plated side of a glass plate being processed.

Fitted between the two chains 21, 22 are also the members that form part of the cathodic circuit, and that consist of metal tubes 50, to which a plastic coating, e.g. a polyethylene coating 51 is applied. Said tubes are supported by the chain links by means of the plates 28, made of electrically insulating material, the tubes being fastened by straps 52 to plates 28. Suitably spaced pins 53 extend outwardly from the metal tubes 50, through the plastic coatings 51. Fast with the ends of said pins are rings, to which a stainless steel chain 54 is secured.

A stainless steel strap 58 is fitted close to the end of each tube 50, in metal-to-metal contact therewith. Said straps are designed to slide along bus bars 59, fast with the sides 26 of tank 2 and connected with a source of negative potential (see FIG. 3). All cathodes 50 are connected with one another by plastics coated conductors 61, that are held in the ring strap 58.

The operation of above described machine is as follows: the glass plate, which has been silver-plated on another machine, is laid on the feed conveyor 4, that is inclined in respect of the horizontal, and by which plate is conveyed to central conveyor 5. The plate, after having been transferred to the latter conveyor, is contacted, on its silver-plated side, by the chain 54, that comes to rest thereon. As a consequence thereof, the silver plating is converted into a cathode, since an electrical connection is established between the positive pole and the silver plating. The conveyors 20 and 5 are synchronically driven, to prevent the chain from being dragged over the silver plating. In the course of such forward motion, the soluble anode 38a is kept electrically connected with the bus bar 36, that is in turn connected with the positive pole. Consequently, the metal of anode is electrolytically transferred to the cathode, i.e. to silver plating, whereon a protective copper film is thus formed. At the discharge end of conveyor 5, the copper-plated glass plate is transferred onto the discharge conveyor, as fitted on the opposite end of machine, and by which the plate is conveyed to further processing stations.

In other words, the essential feature of the invention consists in the provision of a double conveyor and of a single conveyor, the former conveyor being designed to feed the glass plates to the machine, and to carry same plates away therefrom, while the latter conveyor is designed to act as electrode holder and as a support for the members by which the cathodic circuit is formed, and wherein the cathode is represented by the silver-plated face of glass plate.

While the invention has been described in detail with respect to a now preferred embodiment form thereof, it will be understood by those skilled in the art, after understanding the invention, that various changes and modifications may be made therein, without departing from the true spirit and scope of same invention, and is intended, therefore, to cover all such changes and modifications in the appended claims.

What I claim is:
1. For use in the electrochemical deposition of a thin film of a metal such as copper onto an electrically conductive layer of a metal such as silver which has previously been deposited on one side of a glass plate, in the production of mirrors, an electrolyte bath, first conveyor means immersed in the bath for conveying therethrough a glass plate which has the electrically conductive metal layer on one side thereof, second conveyor means situated over said first conveyor means for movement in the same general direction as the glass plates conveyed by said first conveyor means, electrode means carried by said second conveyor means and forming an anode, contact means also carried by said second conveyor means and coacting with the electrically conductive metal layer on a glass plate conveyed by said first conveyor means for establishing an electrical connection therewith to convert the electrically conductive metal layer on the glass plate into an electrode, and a pair of current sources respectively coacting electrically with said electrode means and contact means for connecting the latter into an electrical circuit with a predetermined polarity, so that a protective layer of a metal such as copper will be electrochemically deposited onto the metal layer previously deposited on the glass plate.

2. The combination of claim 1 and wherein said second conveyor means includes a pair of coextensive endless members and a plurality of supports extending between and carried by said pair of endless members, said electrode means which forms the anode including soluble anodes distributed along said second conveyor means between said endless members thereof, and said contact means also including units distributed along said second conveyor means, said units which form the cathode circuit with said metal layer of a glass plate alternating along said second conveyor means with said soluble anodes.

3. The combination of claim 2 and wherein said anodes are carried by said second conveyor means for oscillatory movement.

4. The combination of claim 2 and wherein the source of current for said electrode means includes a bus bar situated beneath said second conveyor means and slidably engaged by the soluble anodes as the latter move together with a lower run of said second conveyor means, and a second bus bar forming the source for said contact means and slidably engaged by the units of the latter as said units move along with an upper run of said second conveyor means.

5. The combination of claim 2 and wherein each of said contact units includes a plastic-coated metal core and a flexible electrically conductive element connected electrically with said core and resting by gravity directly on and in engagement with the metal layer on the glass plate to establish an electrical circuit therewith.

6. The combination of claim 5 and wherein said second conveyor means moves in synchronism with said first conveyor means, so that there is no relative movement between the flexible element of each contact unit and the metal layer of glass plate engaged thereby.

7. The combination of claim 6 and wherein said first conveyor means includes three sections, namely an outer pair of sections and an intermediate horizontal section which is immersed in the bath, said outer sections being inclined with respect to said intermediate section.

References Cited

UNITED STATES PATENTS

| | | | |
|---|---|---|---|
| 1,488,553 | 4/1924 | Peacock | 204—35 XR |
| 532,209 | 1/1895 | Moebius | 204—279 XR |
| 787,701 | 4/1905 | Schulte | 204—206 XR |
| 1,037,370 | 9/1912 | Tompkins | 204—211 XR |
| 1,770,991 | 7/1930 | Offenbacher | 204—19 XR |
| 2,345,356 | 3/1944 | Owen | 204—19 XR |
| 2,591,042 | 4/1952 | Berman et al. | 204—202 |
| 2,924,563 | 2/1960 | Gray | 204—19 XR |
| 2,944,947 | 7/1960 | Luechauer | 204—198 XR |
| 2,989,444 | 6/1961 | Cohn | 204—198 XR |

FOREIGN PATENTS 64,899   12/1912   Switzerland.

JOHN H. MACK, Primary Examiner

W. B. VAN SISE, Assistant Examiner

U.S. Cl. X.R.

204—19, 27, 202, 206, 279